United States Patent [19]
Cullen

[11] Patent Number: 5,446,993
[45] Date of Patent: Sep. 5, 1995

[54] WATERING SYSTEM FOR PLANTS

[76] Inventor: Jeffrey B. Cullen, 25062 Portsmouth St., Mission Viejo, Calif. 92692

[21] Appl. No.: 59,546

[22] Filed: May 11, 1993

[51] Int. Cl.⁶ .............................................. A01G 29/00
[52] U.S. Cl. .................................................... 47/48.5
[58] Field of Search ........................ 47/48.5 G, 40.5; 248/121

[56] References Cited

U.S. PATENT DOCUMENTS

| | | | |
|---|---|---|---|
| 584,886 | 6/1897 | Mead | 47/48.5 G |
| 1,424,157 | 8/1922 | Cook | 47/48.5 G |
| 2,375,860 | 5/1945 | Markham | 47/48.5 G |
| 2,462,442 | 2/1949 | Wallace | 47/43 R |
| 2,850,992 | 9/1958 | Hooper et al. | 47/48.5 G |
| 4,393,622 | 7/1983 | Gallo, Sr. | 47/48.5 G |
| 4,850,137 | 7/1989 | Foster | 47/40.5 |
| 5,349,997 | 9/1994 | Rial | 47/40.5 |

FOREIGN PATENT DOCUMENTS

| | | | |
|---|---|---|---|
| 202146 | 9/1908 | Germany | 47/48.5 G |
| 2642870 | 3/1978 | Germany | 47/48.5 G |

*Primary Examiner*—Ramon S. Britts
*Assistant Examiner*—Joanne C. Downs
*Attorney, Agent, or Firm*—Hawes & Fischer

[57] ABSTRACT

A watering system which permits the convenient watering of potted plants and trees, in particular, evergreen trees, i.e. Christmas trees, in tree stands. The watering system is a tubular device having one end enlarged to form a funnel-like receptacle to receive the water or other liquid which is delivered via the tubular device to the pot or stand through an exit port at the opposite end. The base of the watering system is upheld upright by a band hooked about a projection on the watering system which supports the system against the base of a plant or tree. Between the two ends of the watering system, there is a bend which causes the funnel-like receptacle to extend beyond or into the foliage providing easy access for watering. Decorating elements may be added to camouflage or add ornamentation as desired. The watering system may be divided into several segments for convenience of storage and/or manufacturer.

14 Claims, 5 Drawing Sheets

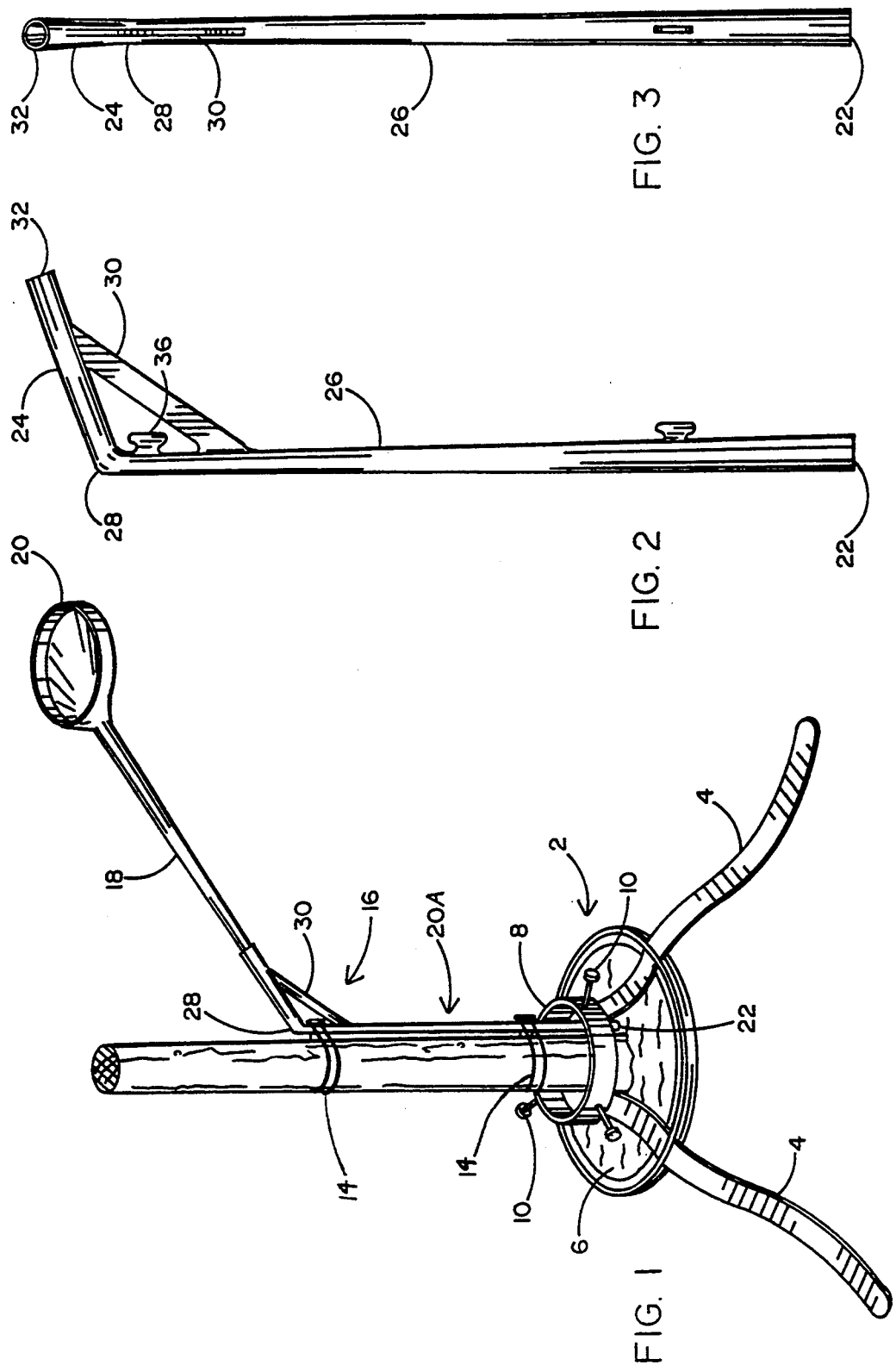

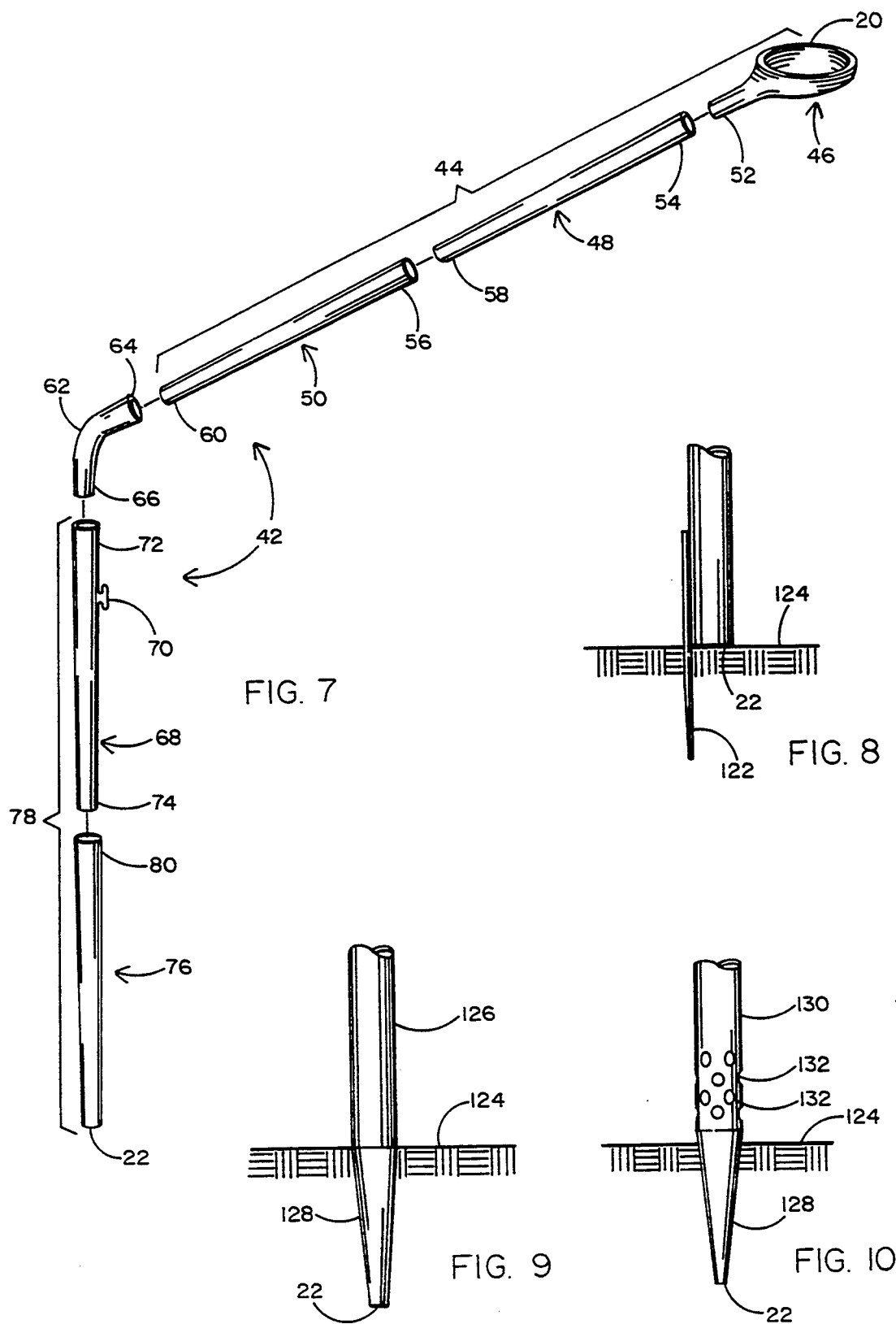

WATERING SYSTEM FOR PLANTS

BACKGROUND OF THE INVENTION

1. Field of the Invention

This invention relates to a watering system which may be used with living plants in pots and trees (e.g. Christmas trees) in tree stands to provide a simplified means for delivering water thereto.

2. Background Art

Drip watering systems, watering cans and a hose are well-known means by which plants and trees may be watered, especially potted plants and evergreen trees in tree stands. These techniques prove to be inadequate in certain situations. For example, many potted plants are kept indoors so that using a hose is impractical. There is no interior water connector for a hose and dragging the hose from out of doors into a house or other buildings is usually not an acceptable solution. In addition to this expected difficulty, evergreen trees in stands present another deterrent because the stands have relatively shallow wells or dishes for the water. Water delivered by a hose into such a well or dish is likely to cause splashing and/or overflow. Moreover, the shape of an evergreen tree is such that it is considerably more bushy and longer limbed at the bottom making it awkward to replenish the water in the tree stand. Failure to provide water to the evergreen tree in the stand has all too often caused tragic results.

The use of a watering can poses another set of problems. Some plants are extremely bushy about the base making it difficult to gain access to the pot for watering. When plants are grouped together, the caretaker must usually reach across adjacent plants to water the more distant ones. Even if the caretaker of the plants or tree uses a watering can, there are frequently accidents in which the water spills on the floor or the carpet because the caretaker is trying to aim the water out of the watering can and into the pot or tree stand. This problem is particularly acute with live Christmas trees which are frequently surrounded by gifts. The outcome in this situation may well be watered gifts in addition to a wet floor.

Drip watering systems have been developed for indoor plants which are reasonably effective, but require an interconnection of tubing and hosing or a separate system for each plant. These systems are not altogether acceptable in every situation and have inherent problems. A successful drip watering system for evergreen trees in stands is not presently known.

None of the present watering systems provide a simple effective means of distributing water from an external source into the soil of a plant pot or reservoir of a tree stand.

SUMMARY OF THE INVENTION

The instant invention is directed to a watering system for easily and accurately supplying water to plants in pots and trees in stands. Water or other liquid, such as plant food, is poured into one end of the system and emptied directly from the opposite end of the system into the pot or stand. The watering system permits water and food to be delivered to the pot of the plant or tree stand without the caretaker having to crawl under the plant or tree.

The watering system may be formed from one or more component parts. In a preferred embodiment of the invention, the watering system is formed from two detachably connected parts: a lower portion or base and an upper portion or arm. The arm has a funnel-like structure at one end thereof which receives the water to be delivered to the plant or tree. The arm continues from the funnel to a tubular extension which concludes at a slight taper that is sized for receipt by the lower base portion.

The watering system may be supported upright against the tree or plant by any well-known fastening means, such as cording, plastic ties, and the like. To this end, the base has at least one projection extending therefrom which may be used to hook an elastic or rubber band that surrounds both the watering system and the associated plant or tree.

The lower end of the base may have a spike attached to it which may be inserted into the soil of potted plants thereby supporting the watering system in an upright position alone or in conjunction with a band surrounding the watering system and associated plant or tree. Alternately, the base itself may be tapered and inserted into the soil. There may be openings above the tapered base through which the water may sprinkle out onto the soil.

The funnel-like structure of the upper arm may be expanded into a decorative configuration. The decoration can add a festive touch, especially for evergreen trees. The upper arm may be textured and/or colored to resemble the greenery of the plant or tree. Similarly, the base may be textured, colored green and/or molded to resemble the bark of a tree to provide camouflage against the base of the plant or tree.

BRIEF DESCRIPTION OF THE DRAWINGS

FIG. 1 shows a first embodiment for a watering system which forms the present invention attached to the base of tree within a tree stand;

FIG. 2 shows a side view of the base portion of the watering system of FIG. 1 detached from the tree of FIG. 1;

FIG. 3 is a front view of the base portion of FIG. 2;

FIG. 7 shows an exploded view of a segmented watering system according to a second embodiment of the present invention;

FIG. 8 shows the base of the watering system of FIGS. 1 and 7 with a spike attached thereto inserted into soil;

FIG. 9 shows a tapered base for the watering system of FIGS. 1 and 7 inserted into soil;

FIG. 10 shows the base of FIG. 9 with openings in the base portion above the soil;

DESCRIPTION OF THE PREFERRED EMBODIMENT

Figure 4:
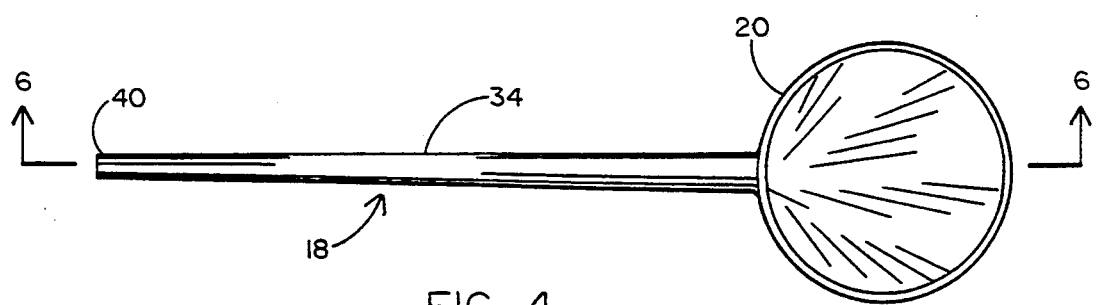
FIG. 4 is a top view of a funnel portion of the watering system of FIG. 1.

Referring initially to FIG. 1, there is shown a conventional tree stand 2 having a plurality of spaced legs 4 and a well 6 for collecting water. Centrally positioned above the well 6 by means of legs 4 is a cylinder 8 having a plurality of locking pegs 10. The well 6, cylinder 8 and pegs 10 cooperate with one another to support a trunk 12 of an evergreen (e.g. Christmas) tree. Encircling the trunk 12 are a pair of bands 14. As will be disclosed in greater detail hereinafter, the bands 14 may be tape, cording, rubber bands, plastic ties, and the like, which hold the watering system 16 upright and securely against the trunk 12.

According to a first embodiment of the present invention, the watering system 16 is a tubular structure comprising the detachable interconnection of an upper arm 18 and a lower base 20A. The upper arm 18 includes a funnel-shaped opening 20 locating at the proximal end thereof. The funnel-shaped opening 20 is adapted to receive liquid, usually water, food, or the like, to be delivered to the well 6 via the tubular structure of watering system 16. More particularly, water flows from the funnel-shaped opening 20, through system 16 and outwardly from an exit port 22 located at the distal end of lower base 20A.

Referring concurrently to FIGS. 1-3 of the drawings, the lower base 20A is shown detached from system 16 and having first and second leg members 24 and 26. In the assembled relationship of FIG. 1, leg member 26 is generally vertical and parallel to the tree trunk 12, and leg member 24 is aligned transversely with leg member 26, such that an angle of approximately 110 degrees is formed therebetween. More particularly, the lower base 20A is bent at an elbow 28 to create the angle between first and second leg members 24 and 26. In this regard, a strut 30 is positioned between the bent legs 24 and 26 of watering system 16 to form a triangle therewith. Although the strut 30 is desirable for providing additional support for the leg member 24 of watering system 16, it is to be understood that such strut 30 is not necessary to the present embodiment and, therefore, may be eliminated therefrom. Moreover, although the first and second leg members 24 and 26 of the lower base 20A have been described as forming an angle of approximately 110 degrees, this should not be regarded as a limitation of the present embodiment, and the leg members 24 and 26 may be bent at elbow 28 at any suitable angle.

As is best shown in FIGS. 2 and 3, the leg member 24 of the lower base 20A includes an opening 32 at its upper end within which to receive the proximal end of arm 18. That is to say, the upper arm 18 includes the aforementioned funnel-shaped opening 20 at one end thereof which communicates with an elongated extension tube 34. In the assembled relationship of FIG. 1, the tube 34 of upper arm 18 is slightly tapered so as to be detachably received at the opening 30 in the leg member 24 of lower base 20A. Although the watering system 16 described in the present embodiment is shown as comprising two detachable members (i.e. upper arm 18 and lower base 20A) this is merely for convenience of transport and storage. However, it is to be understood that the arm 18 and base 20A may be coextensively and permanently interconnected to one another.

Referring once again to FIGS. 2 and 3, there is shown a pair of projections 36 and 37 projecting from the leg member 26 of lower base 20A. The projections 36 and 37 can be used to support the bands 14 which tie and support watering system 16 relative to the tree trunk 12. As shown in FIG. 1, each band 14 hooks onto a projection 36 or 37 and surrounds both the tree trunk 12 and the vertical leg member 26 of the lower base 20A, thereby supporting the watering system 16 in an upright position with leg member 26 held in parallel alignment with the tree trunk 12.

Figure 5:
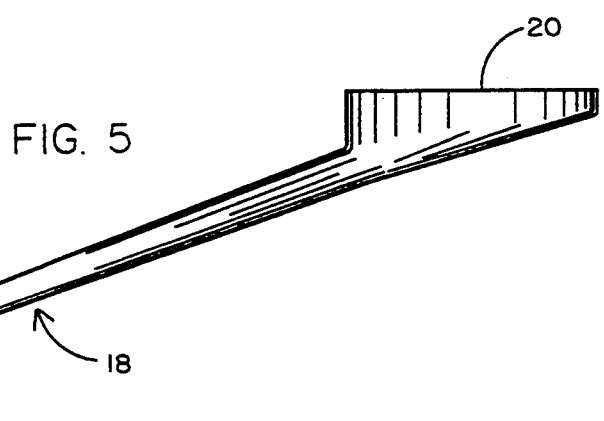
FIG. 5 is a side view of the funnel portion of FIG. 4.
Figure 6:
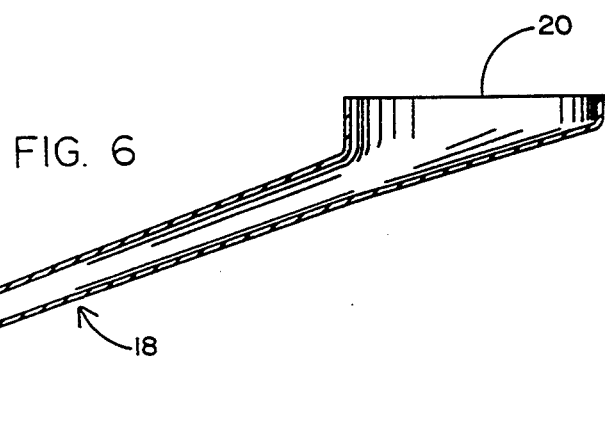
FIG. 6 is a cross-section of the funnel portion of FIG. 4.

Referring to FIGS. 4, 5 and 6, the upper arm 18 is shown detached from the watering system 16 of FIG. 1. As previously disclosed, the distal end of arm 18 has funnel-shaped opening 20. As is best seen in FIGS. 5 and 6, funnel opening 20 is similar to a shallow dish which communicates with the extension tube 34 that tapers slightly to a connector port 40 at the opposite end of arm 18. The connector port 40 interconnects upper arm 18 with lower base 20A at opening 32. The funnel opening 20 is considerably larger in diameter compared to the diameter of extension tube 34 to provide an adequate opening into which the caretaker of the tree or plant can easily pour water without spillage. The taper of the extension tube 34 to connector port 40 is sufficient to permit connector port 40 to fit within the arm receiving opening 32 of lower base 20A.

Figures 11, 12, 13:
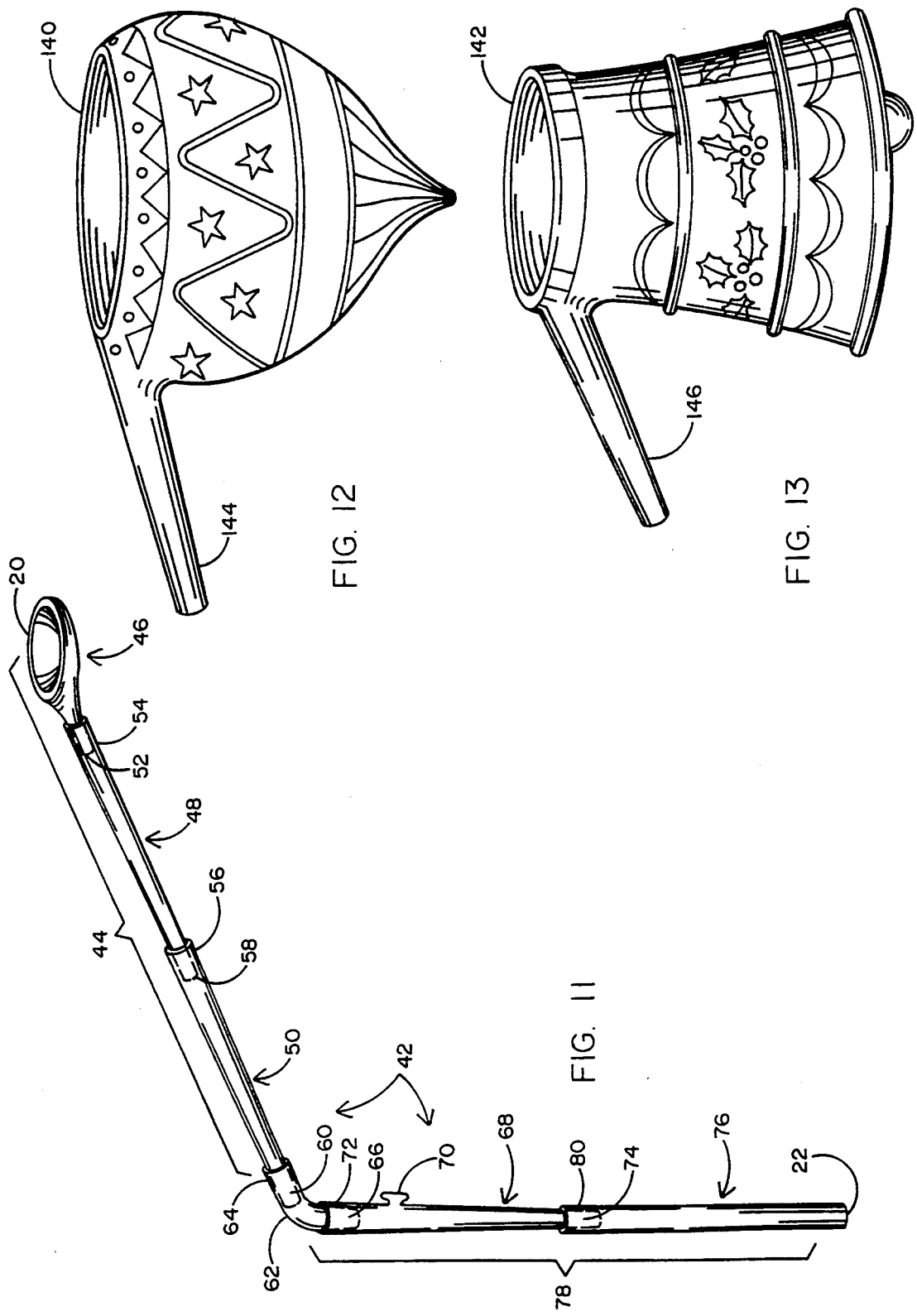
FIG. 11 shows the watering system of FIG. 7 in the assembled relationship.
FIG. 12 is shows decorative version of the funnel portion according to a third embodiment of the present invention.
FIG. 13 shows another decorative version of the funnel portion according to a fourth embodiment of the present invention.

FIGS. 7 and 11 of the drawings illustrate a watering system 42 separated into a plurality of (e.g. 6) detachably connected parts. The additional segmentation results in smaller sized pieces which are more compact for storage and packaging purposes. An upper arm 44 shown in FIGS. 7 and 11 is divided into three segments: a funnel segment 46, a first tube 48 and a second tube 50. The funnel segment 46 has a funnel shaped opening 20 which is similar to that shown in FIGS. 4, 5 and 6. The funnel opening 20 of funnel segment 46 communicates with a funnel connector 52 which is a short and slightly tapered structure.

The taper of the funnel connector 52 is sufficient to permit the connector to fit within the first tube 48. The first and second tubes 48 and 50 are each slightly tapered from their proximal ends 54, 56 toward their distal ends 58, 60. The tapering of the first and second tubes 48 and 50 permit the upper arm 44 to be assembled as shown in FIG. 11. Moreover, the tapered funnel connector 52 of funnel segment 46 nests within the proximal end 54 of the first tube 48. The distal end 58 of the first tube 48 nests within the proximal end 56 of the second tube 50. In turn, the distal end 60 of the second tube 60 will nest within the next segment, viz, an elbow 62.

Elbow segment 62 has an angle of approximately 110 degrees and has an arm opening 64 at one end and a base connector 66 at the opposite end. The arm opening 64 receives the distal end 60 of the second tube 50 of upper arm 44. The elbow 62 tapers from the arm receiving opening 64 toward the base connector 66. The base connector 66 is tapered sufficiently to nest snugly within the next segment, a first leg 60 of lower base 74.

The first leg 68 is essentially tubular having at least one projection 70, an elbow receiving opening 72 at one end and tapers toward the opposite end to a base connector 74. Projection 70, along with the aforementioned band (designated 14 in FIG. 1), provide the upright support for the watering system 42. The elbow receiving opening 72 receives the base connector 66 of elbow 62.

The base connector 74 nests within a second leg 66 of lower base 78. The second leg 76 is tubular having a leg receiving opening 80 at the upper end and the exit port 22 of system 42 at the lower end which is positioned over the well 6 of a tree stand 2 or above the soil surrounding a plant. No projection is shown on the second base 80, but an additional projection could be added for further support if desired.

Although FIGS. 7 and 11 show the watering system 42 divided into six pieces, it is obvious that more or less divisions are possible. Additional nesting base and/or arm sections could also be added if greater extensions are desired. Likewise, sections could be removed to shorten an arm and/or base portion of the watering system as desired.

Figures 14, 15:
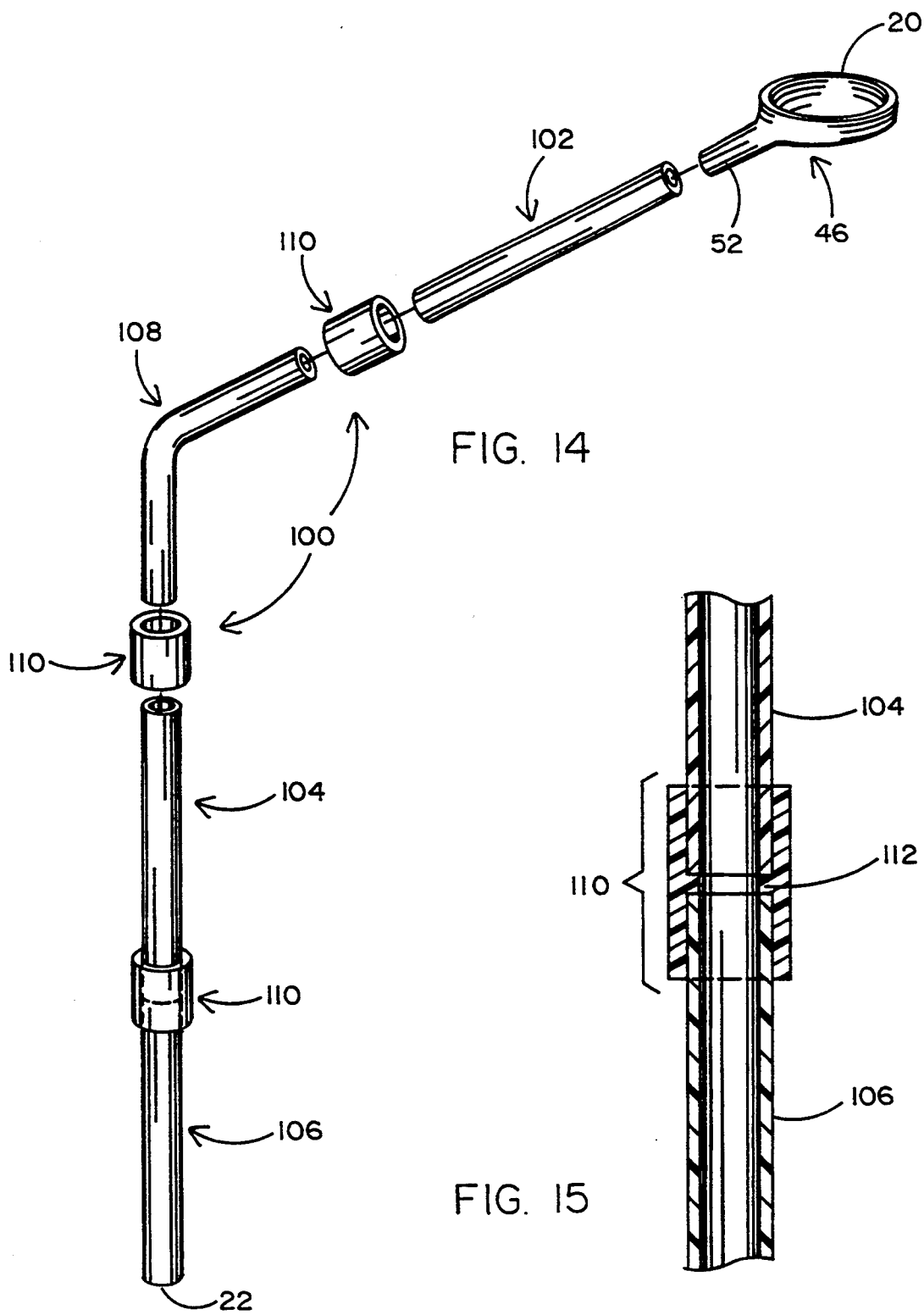
FIG. 14 shows a partially exploded view of a segmented watering system according to a fifth embodiment of the present invention.
FIG. 15 shows a cross section of the connecting system along with segments of the watering system seen in FIG. 14.

Referring concurrently to FIGS. 14 and 15 of the drawings, an alternative means to connect the plurality of segments of a watering system 100 is shown. Rather than being tapered as seen previous embodiments of watering system, namely FIGS. 1-7 and 11, an arm segment 102, an upper base 104, a lower base 106 and an elbow 108 are essentially tubular structures each having basically the same interior and exterior diameters. As seen in other embodiments, an elbow 108 has an angle approximately 110 degrees. A funnel segment 46 has a funnel-shaped opening 20 which is similar to that shown in FIGS. 4, 5, 6, 7 and 11. Funnel connector 52 is similar to that shown in FIGS. 7 and 11 being tapered to insert into upper arm 102.

The untapered tubular parts, viz, upper arm 102, elbow 108, upper base 104 and lower base 106 are detachedly connected by means of a connector 110. As seen in FIG. 15, connector 110 is a tubular structure having an interior diameter slightly larger than the exterior diameter of the tubular segments 102, 108, 104 and 106. The interior diameter of connector 110 snugly receives each of the tubular segments 102, 108, 104 and 106. Approximately midway within connector 110, an internal ring 112 is located. Internal ring 112 is approximately the thickness of the walls of the tubular structures 102, 108, 104 and 106 so that there is minimal to no disruption in the flow of water as it flows from funnel-shaped opening 20 through the detachedly interconnected watering system 100 out exit port 22. The internal ring 112 also assures that the tubular pieces (102, 108, 104 or 106) are each inserted a sufficient, but not excessive, distance into the connector 110.

Referring now to FIGS. 8, 9 and 10 which show alternative embodiments of a base member designated as 26 in FIGS. 2 and 3, 76 in FIGS. 7 and 11, and 106 in FIGS. 14 and 15. FIG. 8 shows the distal end of base 120 having a spike 122. Spike 122 is attached at base 120 and extends beyond exit port 22 of base 120. Spike 122 may be inserted into soil 124 of a potted plant thereby providing an additional or alternative means by which the watering system (designated as 16 in FIG. 1, 42 in FIGS. 7 and 11, and 100 in FIG. 14) be supported in an uprighted position.

Referring now to FIG. 9, distal end of base member 126 is shown as having a tapered end 128 with exit port 22. The tapered end 128 may be inserted directly into the soil 124 of a pot such that water goes directly into the soil 124 from exit port 22. By being inserted into the soil, the watering system (designated as 16 in FIG. 1, 42 in FIGS. 7 and 11, and 100 in FIG. 14) has additional or alternative means by which it is supported in an upright position. The tapered end 128 of base member 126 also limits the rate of flow of liquid through the watering system.

FIG. 10 shows a third embodiment of a base member 130 which also has a tapered end 128 and an exit port 22. In addition to exit port 22, water may also leave the watering system 16, 42 or 100 by openings 132 positioned just above the soil 124 and tapered end 132. These openings 132 permit water to be sprinkled over soil 124 within a pot as it flows toward exit port 22.

Referring concurrently to FIGS. 12 and 13 of the drawings, there are shown representative designs which may be used with and surrounding funnel openings 140 and 142. The designs in FIGS. 12 and 13 give the appearance of a Christmas ornament within the tree yet provide a convenient means of delivering water to the tree stand. The expansion of the funnel openings 140 and 142 in FIGS. 12 and 13 further assists in locating the funnel openings 140 and 142. The designs are shown with short connectors 144 and 146, but may, obviously, be used with more elongated connectors to be coextensively joined to form a complete watering system.

Although FIG. 15 shows in cross section connector 110 with upper base 104 and lower base 106, it is obvious that a similar relationship occurs between each of the other tubular pieces (102 and 108; 108 and 104).

The watering system of the present invention may also be designed with such variations as having a trunk appearance embossed and colored onto the base pieces while the arm pieces may be colored and textured like the foliage of the tree or plant. Other variations to decorate and/or camouflage are contemplated as well.

It will be apparent that while a preferred embodiment of the invention has been shown and described, various modifications and changes may be made without departing from the true spirit and scope of the invention. For example, although reference has been made to an evergreen tree and the use of the watering system has been shown with an evergreen tree stand, this is not to be regarded as a limitation of the applicability and usefulness of the watering system. Thus, the watering system may be advantageously used with plants both indoors and out, in pots or not, as well as trees within tree stands.

What is claimed:

1. A watering system for a plant comprising a hollow tube having an exit port at a first end and a liquid receiving funnel at a second end, said tube including a bend between its first and second ends;
   support means, connected to said hollow tube, for orientationally securing said hollow tube; and
   a strut located adjacent said bend.

2. The watering system recited in claim 1, wherein said support means is a band connected to said hollow tube.

3. The watering system recited in claim 1 wherein said bend is located approximately at a midpoint of said hollow tube between said exit port and said liquid receiving funnel.

4. The watering system recited in claim 1 wherein said support means further comprises a spike attached at and extending beyond and axially generally parallel to and offset from said exit port.

5. The watering system recited in claim 1 wherein said first end is tapered at said exit port.

6. The watering system recited in claim 1 which further comprises a plurality of openings above said exit port.

7. A watering system comprising:

a first hollow tube having a liquid receiving funnel at a first end, and having a second end; and a second hollow tube having a first end and defining a bend near said first end, and having a second end, said second end of said first hollow tube connected to said first end of said second hollow tube and wherein said second hollow tube further defines a projection between said bend and said second end to facilitate surroundably engaging said second hollow tube and at least one other structure.

8. The watering system recited in claim 7 further comprising a strut located adjacent said bend.

9. The watering system recited in claim 7 further comprising a spike attached at and extending beyond and axially generally parallel to and offset from said said second end of said second hollow tube.

10. The watering system recited in claim 7 wherein said second end of said second hollow tube is tapered at said second end.

11. The watering system recited in claim 7 which further comprises a plurality of openings above said second end of said second hollow tube.

12. The watering system of claim 7 wherein said liquid receiving funnel has an expanded external surface for easy location of said liquid receiving funnel.

13. The watering system of claim 7 wherein said second end of said second hollow tube has a reduced cross section for limiting the rate of flow of liquids through said watering system.

14. The watering system of claim 7 wherein said liquid receiving funnel is non-concentric.

* * * * *